US012710283B2

(12) United States Patent
Williamson

(10) Patent No.: US 12,710,283 B2
(45) Date of Patent: Aug. 18, 2026

(54) METHOD, APPARATUS, AND COMPUTER PROGRAM PRODUCT FOR SELECTIVE PROCESSING OF SENSOR DATA

(71) Applicant: HERE GLOBAL B. V., Eindhoven (NL)

(72) Inventor: Dennis Scott Williamson, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 189 days.

(21) Appl. No.: 18/145,203

(22) Filed: Dec. 22, 2022

(65) Prior Publication Data

US 2024/0210203 A1 Jun. 27, 2024

(51) Int. Cl.
*G01C 21/00* (2006.01)
*G01C 21/32* (2006.01)

(52) U.S. Cl.
CPC ......... *G01C 21/3815* (2020.08); *G01C 21/32* (2013.01); *G01C 21/3841* (2020.08)

(58) Field of Classification Search
CPC . G01C 21/3815; G01C 21/3841; G01C 21/32
See application file for complete search history.

(56) References Cited

U.S. PATENT DOCUMENTS 8,284,995 B2 10/2012 Diaz et al.
8,417,715 B1 * 4/2013 Bruckhaus ............ G06Q 10/04 705/26.1
11,126,200 B2 9/2021 Gaal et al.
11,402,220 B2 8/2022 Rabel et al.
2009/0138497 A1 5/2009 Zavoli et al.
2020/0264628 A1 * 8/2020 Gaal ...................... G06Q 50/40
2020/0292331 A1 9/2020 Rabel et al.
2021/0004363 A1 * 1/2021 Bailly .................... G06T 17/05
2021/0107530 A1 4/2021 Buerkle et al.

OTHER PUBLICATIONS

Extended European Search Report for European Application No. 23218785.6 dated May 21, 2024, 9 pages.
Office Action for European Application No. 23218785.6 dated Dec. 17, 2025, 8 pages.
Massow et al., "Deriving HD Maps for Highly Automated Driving from Vehicular Probe Data", 2016 IEEE 19th International Conference on Intelligent Transportation Systems (ITSC), (Nov. 1-4, 2016), 8 pages.

* cited by examiner

*Primary Examiner* — Andrew J Cromer
(74) *Attorney, Agent, or Firm* — Alston & Bird LLP

(57) ABSTRACT

A method is provided for selective processing of sensor data, and more particularly, to parsing sensor data from a data stream to identify sensor data relevant to specific requests, and processing the relevant data based on the type of request. Methods include: receiving a campaign management request defining requested source data metrics; receiving source data from a plurality of sources within a geographic area; determining a subset of the source data that satisfies the requested source data metrics; processing the subset of the source data satisfying the requested source data metrics to obtain observations; and updating map data of a map database based on the observations.

20 Claims, 5 Drawing Sheets

METHOD, APPARATUS, AND COMPUTER PROGRAM PRODUCT FOR SELECTIVE PROCESSING OF SENSOR DATA

TECHNOLOGICAL FIELD

An example embodiment of the present disclosure relates to selective processing of sensor data, and more particularly, to parsing sensor data from a data stream to identify sensor data relevant to specific requests, and processing the relevant data based on the type of request.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry and objects, such as signs, poles, etc. Incorrect lane geometry information can be problematic as such lane geometry may be used for route guidance and at least semi-autonomous vehicle control. Inaccurate lane geometries can reduce the effectiveness of route guidance and vehicle autonomy. Inaccurate objects can be problematic as they can be used for refining location, identifying rules and restrictions, and to help guide autonomous vehicles. Conversely, correct map data benefits from being reinforced as correct to improve confidence in the map data. The accuracy of map data including point map features and objects is important for highly automated vehicles and map data needs to be kept current.

BRIEF SUMMARY

A method, apparatus, and computer program product are provided in accordance with an example embodiment for selective processing of sensor data, and more particularly, to parsing sensor data from a data stream to identify sensor data relevant to specific requests, and processing the relevant data based on the type of request. Embodiments provided herein include an apparatus having at least one processor and at least one memory including computer program code with the at least one memory and computer program code being configured to, with the processor, cause the apparatus to: receive a campaign management request defining requested source data metrics; receive source data from a plurality of sources within a geographic area; determine a subset of the source data that satisfies the requested source data metrics; process the subset of the source data satisfying the requested source data metrics to obtain observations; and update map data of a map database based on the observations.

According to some embodiments, the apparatus is further caused to convert the subset of the source data that satisfies the requested source data metrics into a standardized format, where causing the apparatus to process the subset of the source data satisfying the requested source data metrics to obtain observations includes causing the apparatus to process the subset of the source data satisfying the requested source data metrics in the standardized format. According to some embodiments, the observations are consensus observations, where causing the apparatus to process the subset of the source data satisfying the requested source data metrics to obtain observations includes causing the apparatus to fuse the subset of the source data satisfying the requested source data metrics to obtain the observations. Causing the apparatus of some embodiments to fuse the subset of the source data satisfying the requested source data metrics to obtain the observations includes, in some embodiments: aggregate drive instances within the source data to form aggregated drives; align the aggregated drives with underlying map data to form aggregated, aligned drives; and conflate the aggregated, aligned drives into the consensus observations.

According to certain embodiments, causing the apparatus to process the subset of the source data satisfying the requested source data metrics to obtain observations includes causing the apparatus to: determine if the subset of the source data satisfying the requested source data metrics is same data relative to the map data of the map database; and generate a map data difference in response to the subset of the source data satisfying the requested source data metrics being different relative to the map data of the map database. According to some embodiments, the apparatus is further caused to: update a model of the map database with a timestamp from the subset of the source data satisfying the requested source data metrics in response to the subset of the source data satisfying the requested source data metrics being same data relative to the map data of the map database. The apparatus of some embodiments is further caused to: provide for at least one of semi-autonomous vehicle control or navigational guidance using the updated map data. According to some embodiments, the requested source data metrics include one or more of: an indication of windshield wipers being off when the source data was collected, or an indication of headlights being off when the source data was collected. Windshield wipers being on imply precipitation, while headlights being on implies darkness, both such conditions can adversely impact the quality of sensor data received.

Embodiments provided herein include a method including: receiving a campaign management request defining requested source data metrics; receiving source data from a plurality of sources within a geographic area; determining a subset of the source data that satisfies the requested source data metrics; processing the subset of the source data satisfying the requested source data metrics to obtain observations; and updating map data of a map database based on the observations.

According to some embodiments, the method further includes converting the subset of the source data that satisfies the requested source data metrics into a standardized format, where processing the subset of the source data satisfying the requested source data metrics to obtain observations includes processing the subset of the source data satisfying the requested source data metrics in the standardized format. According to some embodiments, the observations are consensus observations, where processing the subset of the source data satisfying the requested source data metrics to obtain observations includes fusing the subset of the source data satisfying the requested source data metrics to obtain the observations. Fusing the subset of the source data satisfying the requested source data metrics to obtain the observations includes, in some embodiments: aggregating drive instances within the source data to form aggregated drives; aligning the aggregated drives with underlying map data to form aggregated, aligned drives; and conflating the aggregated, aligned drives into the consensus observations.

According to certain embodiments, processing the subset of the source data satisfying the requested source data metrics to obtain observations includes: determining if the subset of the source data satisfying the requested source data metrics is same data relative to the map data of the map database; and generating a map data difference in response to the subset of the source data satisfying the requested source data metrics being different relative to the map data of the map database. According to some embodiments, the method further includes: updating a model of the map database with a timestamp from the subset of the source data satisfying the requested source data metrics in response to the subset of the source data satisfying the requested source data metrics being same data relative to the map data of the map database. The method of some embodiments further includes: providing for at least one of semi-autonomous vehicle control or navigational guidance using the updated map data. According to some embodiments, the requested source data metrics include one or more of: an indication of windshield wipers being off when the source data was collected, or an indication of headlights being off when the source data was collected.

Embodiments provided herein include a computer program product having at least one non-transitory computer-readable storage medium having computer-executable program code instructions stored therein, the computer-executable program code instructions including program code instructions to: receive a campaign management request defining requested source data metrics; receive source data from a plurality of sources within a geographic area; determine a subset of the source data that satisfies the requested source data metrics; process the subset of the source data satisfying the requested source data metrics to obtain observations; and update map data of a map database based on the observations.

According to some embodiments, the computer program product further includes program code instructions convert the subset of the source data that satisfies the requested source data metrics into a standardized format, where the program code instructions to process the subset of the source data satisfying the requested source data metrics to obtain observations includes program code instructions to process the subset of the source data satisfying the requested source data metrics in the standardized format. According to some embodiments, the observations are consensus observations, where the program code instructions to process the subset of the source data satisfying the requested source data metrics to obtain observations include program code instructions to: aggregate drive instances within the source data to form aggregated drives; align the aggregated drives with underlying map data to form aggregated, aligned drives; and conflate the aggregated, aligned drives into the consensus observations.

According to certain embodiments, the program code instructions to process the subset of the source data satisfying the requested source data metrics to obtain observations include program code instructions to: determine if the subset of the source data satisfying the requested source data metrics is same data relative to the map data of the map database; and generate a map data difference in response to the subset of the source data satisfying the requested source data metrics being different relative to the map data of the map database. According to some embodiments, the computer program product further includes program code instructions to: update a model of the map database with a timestamp from the subset of the source data satisfying the requested source data metrics in response to the subset of the source data satisfying the requested source data metrics being same data relative to the map data of the map database. The computer program product of some embodiments further includes program code instructions to: provide for at least one of semi-autonomous vehicle control or navigational guidance using the updated map data. According to some embodiments, the requested source data metrics include one or more of: an indication of windshield wipers being off when the source data was collected, or an indication of headlights being off when the source data was collected.

Embodiments provided herein include an apparatus including: means for receiving a campaign management request defining requested source data metrics; receiving source data from a plurality of sources within a geographic area; means for determining a subset of the source data that satisfies the requested source data metrics; means for processing the subset of the source data satisfying the requested source data metrics to obtain observations; and means for updating map data of a map database based on the observations.

According to some embodiments, the apparatus further includes means for converting the subset of the source data that satisfies the requested source data metrics into a standardized format, where the means for processing the subset of the source data satisfying the requested source data metrics to obtain observations includes means for processing the subset of the source data satisfying the requested source data metrics in the standardized format. According to some embodiments, the observations are consensus observations, where the means for processing the subset of the source data satisfying the requested source data metrics to obtain observations includes: means for aggregating drive instances within the source data to form aggregated drives; means for aligning the aggregated drives with underlying map data to form aggregated, aligned drives; and means for conflating the aggregated, aligned drives into the consensus observations.

According to certain embodiments, the means for processing the subset of the source data satisfying the requested source data metrics to obtain observations includes: means for determining if the subset of the source data satisfying the requested source data metrics is same data relative to the map data of the map database; and means for generating a map data difference in response to the subset of the source data satisfying the requested source data metrics being different relative to the map data of the map database. According to some embodiments, the apparatus further includes: means for updating a model of the map database with a timestamp from the subset of the source data satisfying the requested source data metrics in response to the subset of the source data satisfying the requested source data metrics being same data relative to the map data of the map database. The apparatus of some embodiments further includes: means for providing for at least one of semi-autonomous vehicle control or navigational guidance using the updated map data. According to some embodiments, the requested source data metrics include one or more of: an indication of windshield wipers being off when the source data was collected, or an indication of headlights being off when the source data was collected.

BRIEF DESCRIPTION OF THE DRAWINGS

Figure 1:
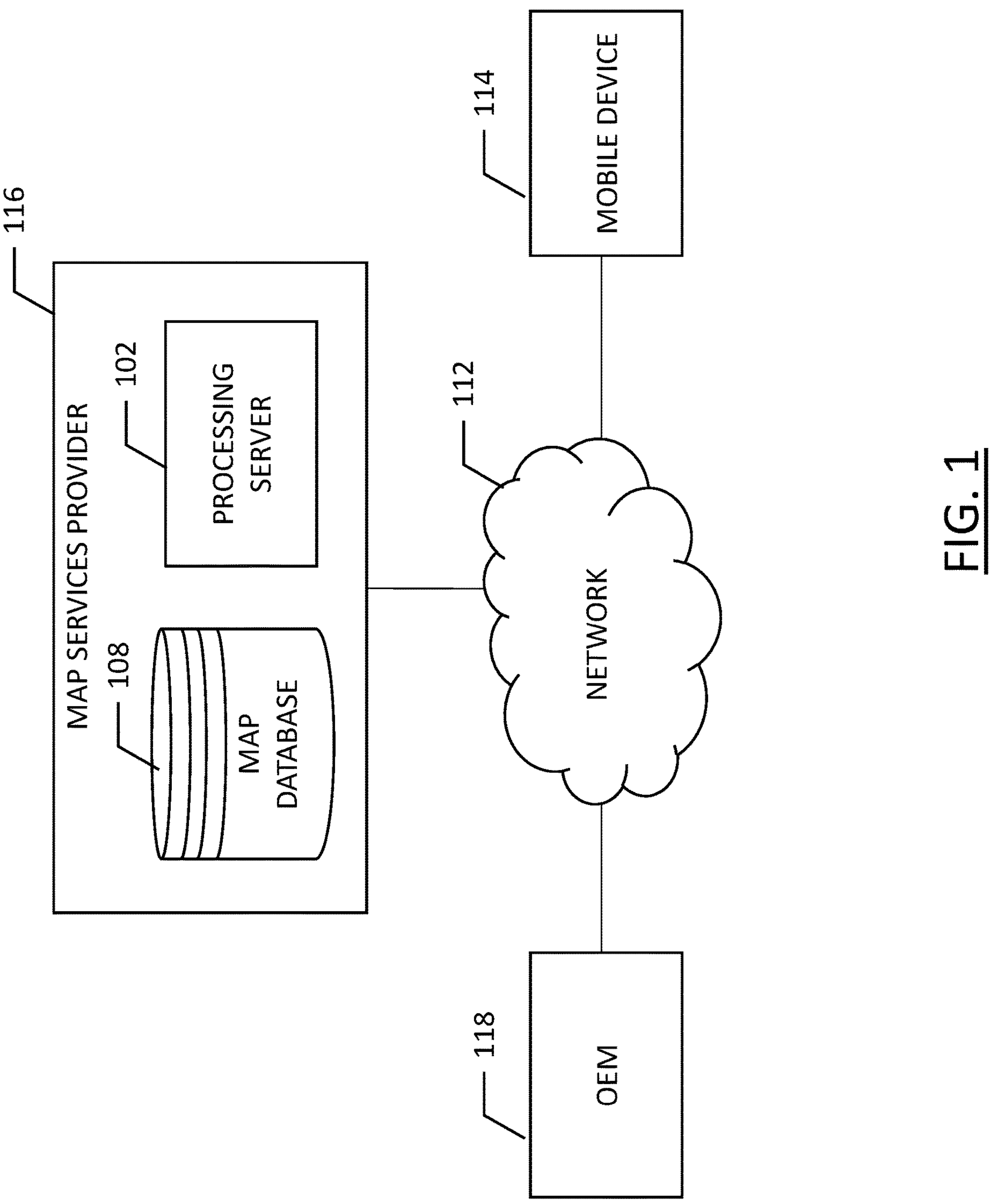
Figure 2:
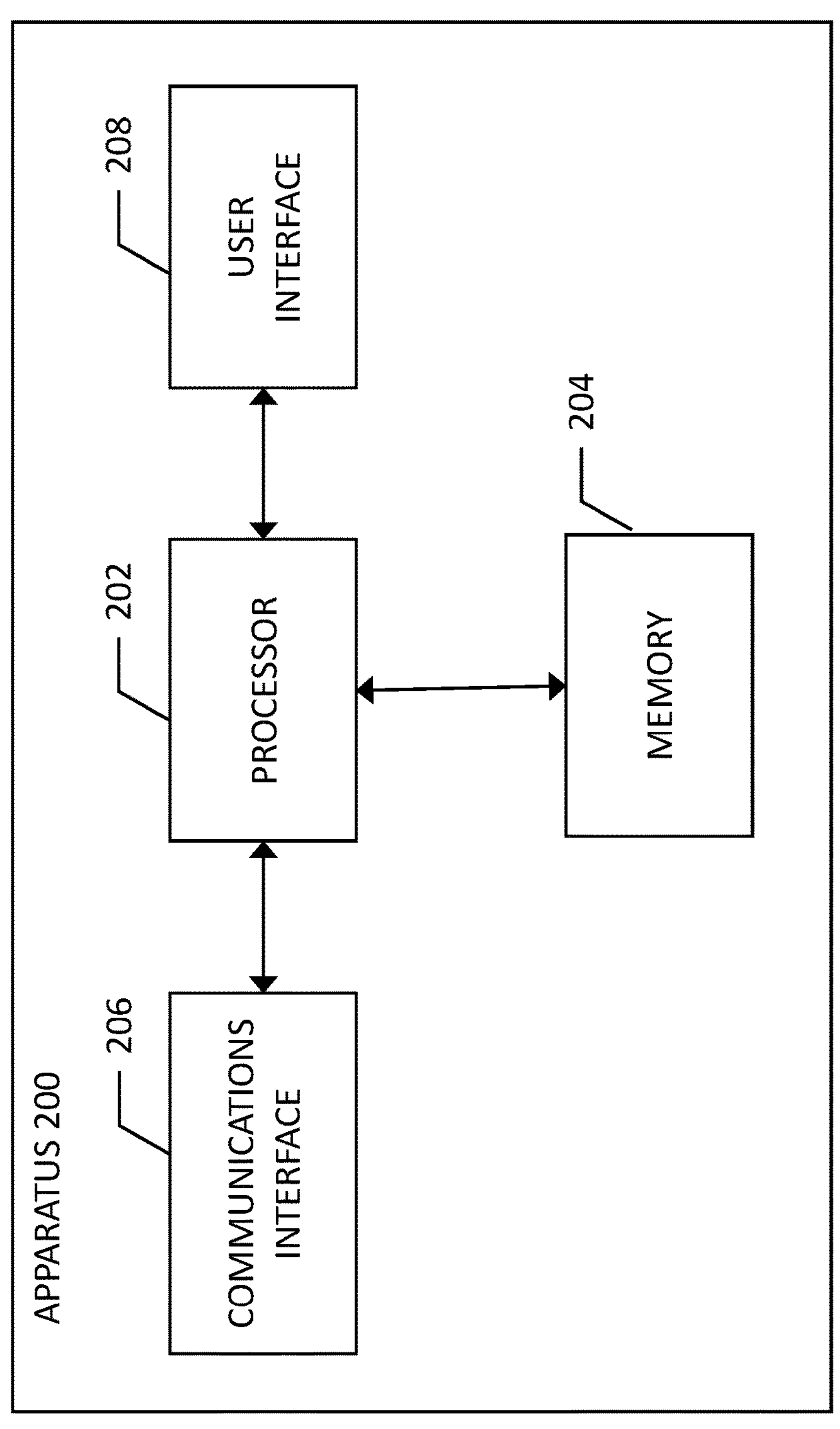
Figure 3:
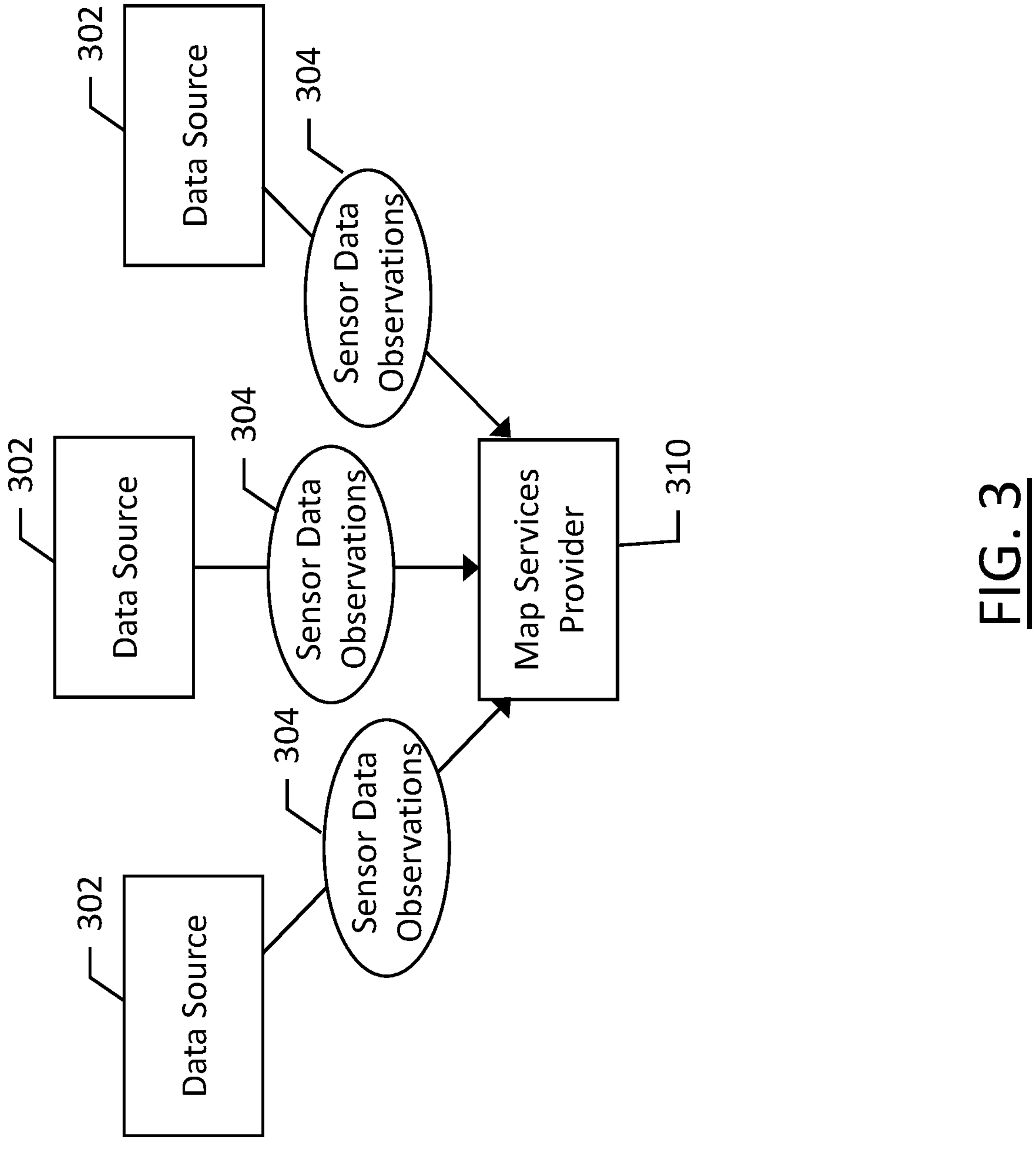
Figure 4:
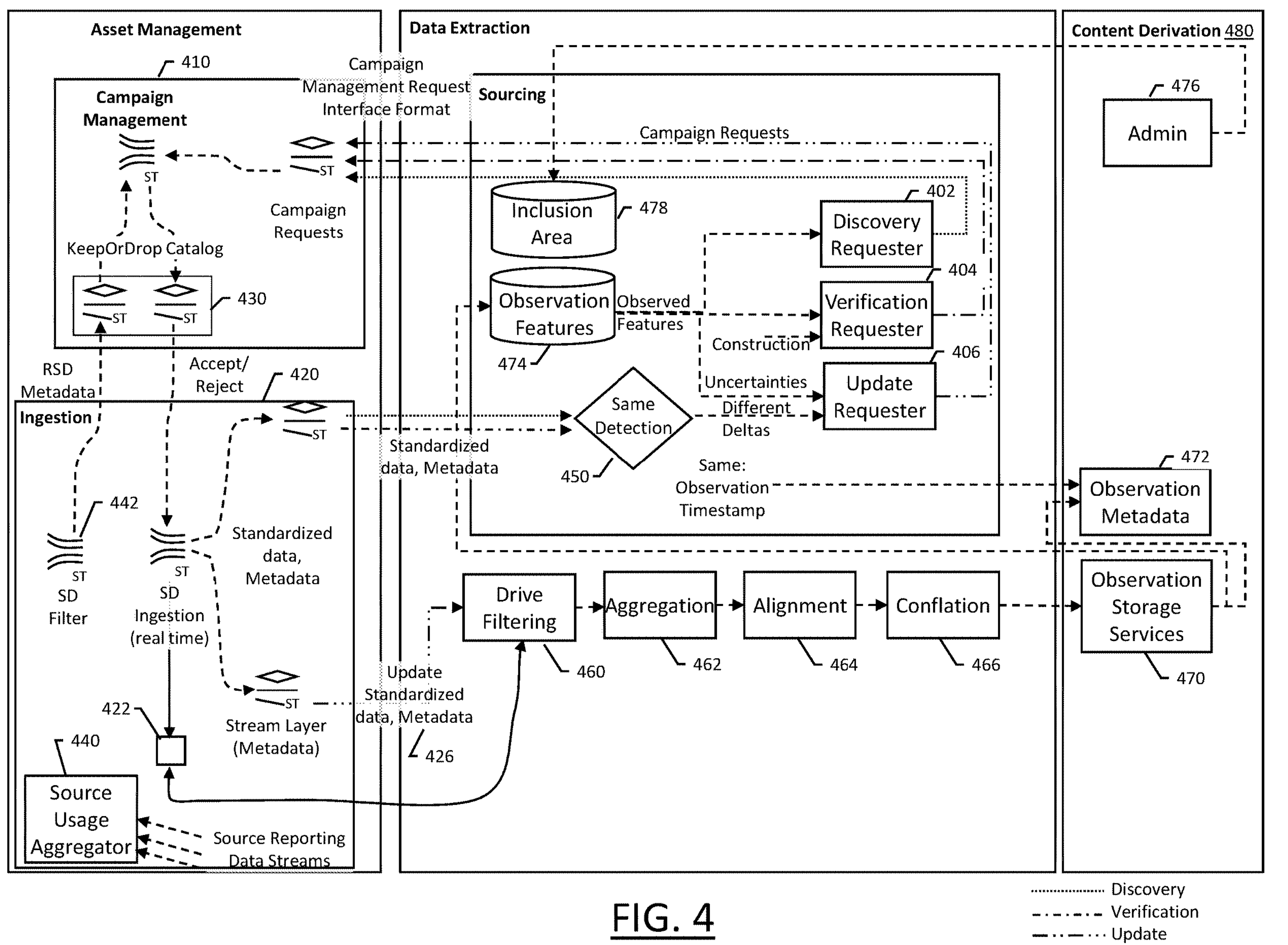
Figure 5:
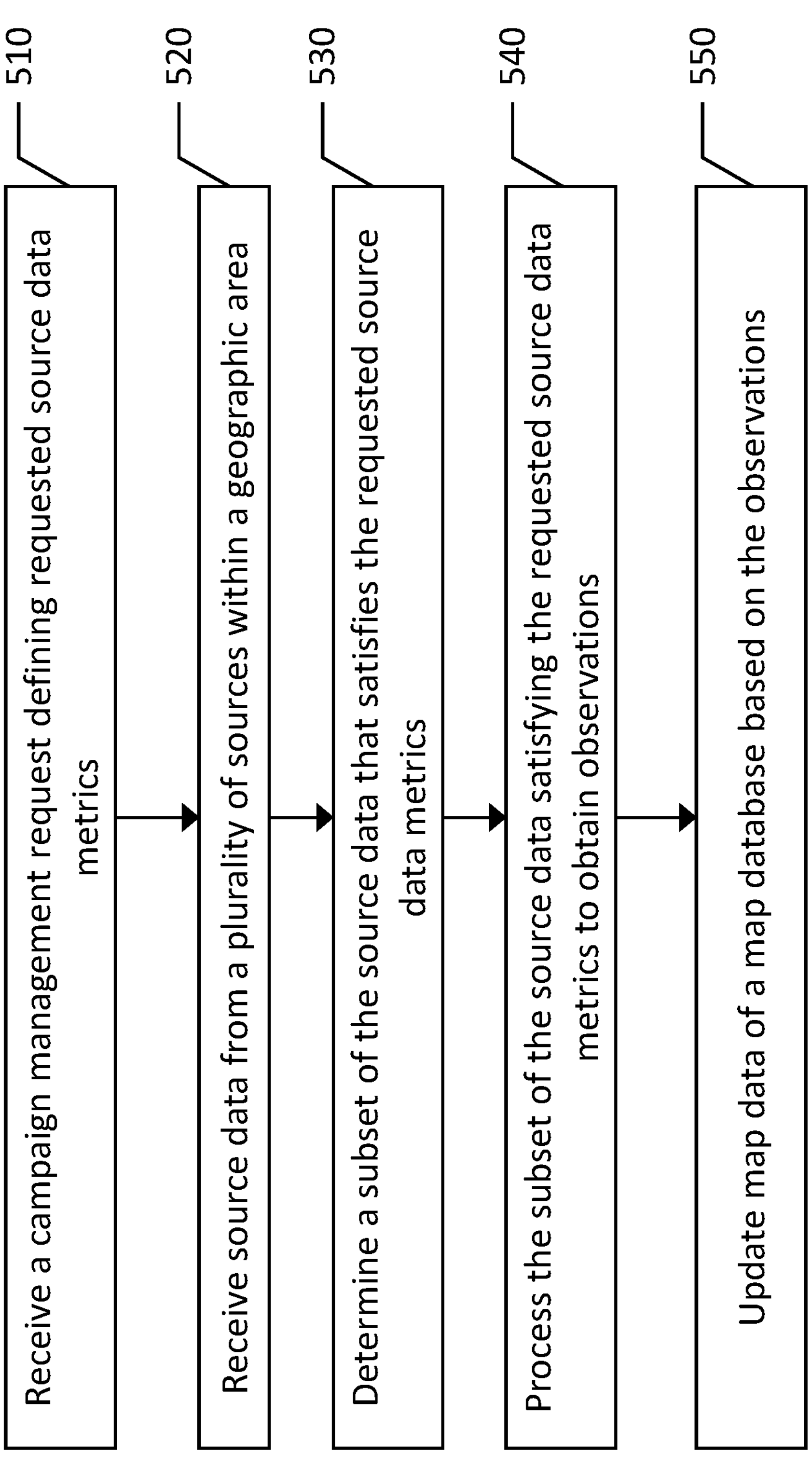

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for processing data from a variety of sources according to an example embodiment of the present disclosure;

FIG. 3 illustrates aggregation of data from a variety of data sources according to an example embodiment of the present disclosure;

FIG. 4 illustrates a block diagram of the processing of sensor data according to an example embodiment of the present disclosure; and FIG. 5 is a flowchart of a method of parsing sensor data from a data stream to identify sensor data relevant to specific requests according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for selective processing of sensor data, and more particularly, to parsing sensor data from a data stream to identify sensor data relevant to specific requests, and processing the relevant data based on the type of request.

Road segment paths, lane line geometry, and object presence/identification are often generated through automated means. Sensor data is collected from a variety of sources and used to generate, build, and heal map data in addition to confirming existing map data. As sensor technology advances, and as vehicles equipped with highly-capable sensor arrays become more ubiquitous, the volume of sensor data available becomes daunting. While a large volume of available sensor data is desirable, the ability to process this large volume of data becomes challenging. Embodiments of the present disclosure function as a preliminary processing operation to improve the efficiency with which sensor data is processed.

Because millions of miles of roads exist, and sensor data from vehicles traveling these roads is becoming more prevalent, the volume of sensor data available is growing exponentially. Embodiments described herein provide an efficient method of processing sensor data that utilizes the large volume of sensor data available, while parsing the sensor data to use only what is necessary for maintaining a reliable map. Sensor data may come from various sources in various formats. The observations or gathered data (e.g., crowd-sourced) can be represented in formats such as images, point clouds, extracted analytical geometries, or probe densities that could be overlapping in terms of coverage.

An example data source includes sensor data gathered as probe data from a device traveling within an environment. The device can be a mobile device such as a phone, navigation device, or the like, but is often a vehicle such as an autonomous or semi-autonomous vehicle equipped with sensors to sense features of an environment through which the vehicle passes. The probe data can include various aspects of geometry of an environment such as road segment paths, lane line geometry, object detection, traffic determination, and the like. Another data source can include satellite imagery, where object detection is performed within the images to identify objects and their respective locations. Lane geometry and lane features (e.g., lane lines, lane boundaries, curbing, etc.) can also be identified in imagery. The different sources of map data have differing degrees of accuracy and timeliness. For example, map data informed by municipalities, such as a department of transportation, may be updated only periodically, such as quarterly. However, crowd-sourced data may be available in real-time or near real-time. Map data service providers may collect map data using specialized vehicles that have a high level of sensor technology, such that these specialized vehicles may provide substantially ground truth data that is interpreted as the most accurate data available. Early, semi-autonomous vehicles that gather point cloud data such as through LiDAR (light distancing and ranging) may be received in near real-time; however, the data may be of limited accuracy due to the age of the technology or the sensor level of the vehicle. While autonomous and semi-autonomous vehicles have a high level of sensor capability, non-autonomous vehicles also have some degree of sensor capability. Data sources as described herein can be from any data source, regardless of autonomous capability. Further, data sources can include non-vehicle sources in some embodiments, where image, LiDAR, or other data can be gathered using sensors associated with various devices.

As technology advances, the data available for collection has increased in volume, such as with location data from personal hand-held devices and vehicles. Further, data from sensors attached to located vehicles (e.g., image sensors, LiDAR, etc.) and satellite imagery further enhances location data. The available data includes vast amounts of useful information, some of which is time sensitive. For example, traffic jams caused by accidents may be resolved after one hour, but within that one hour the information about the accident and the traffic jam is very valuable and informative to others traveling near the location of the accident. To harness the power of this huge volume of data in a timely fashion, it is beneficial to be able to process the data in an automatic fashion, eliminating or minimizing human interventions that are typically expensive and time consuming. Further, identifying which sensor data is useful and a degree to which the sensor data is useful can greatly improve the efficiency with which the sensor data is processed.

Generating map data such as road or lane geometries, map objects, and dynamic information such as traffic directly from probe data is challenging. Probe data refers to any data containing a location (e.g., longitude and latitude, such as Global Positioning System coordinates or GNSS coordinates, cartesian coordinates, etc.) collected by devices while moving within an environment. Such devices can include mobile devices (e.g., cell phones), vehicles (e.g., navigation systems), or the like. Such data often includes trajectories, each recording a trip made by a device or vehicle with timestamps associating location coordinates with a time at the location. Location data from vehicles, either collected from the vehicles or from mobile devices traveling within the vehicles, generally includes location data reflecting the path of underlying roads and lanes thereof, and likely real time information (e.g., traffic) that are not yet reflected anywhere. Extracting the underlying map from a large collection of such data is difficult, particularly due to the volume of available data.

The collection of rich sensor data from vehicles traveling within a road network, such as image data (e.g., 360-degree camera views) and LiDAR (Light Distancing and Ranging) requires sensor arrays associated with vehicles traveling within a road network. Such technology is being adopted at an ever-increasing rate, such that the volume of sensor data available is quickly growing. Processing this volume of data is challenging and can be costly. Embodiments described herein provide a preliminary processing operation that determines the usefulness of incoming sensor data, and processes the data according to its usefulness thereby pruning the volume of data processed to improve efficiency and reduce processing costs.

Campaigns are used in example embodiments of the present disclosure to gather data that is specifically needed or requested. A campaign request constitutes a request for data that fits a particular profile. That profile can include data from a target area (e.g., within a defined geographic boundary), data of a certain quality or reliability (e.g., sensor data gathered by highly capable sensor systems), data from specific travel paths (e.g., sensor data gathered along a particular stretch of roads or from a specific functional class of roads), data that includes specific information, or any other way in which probe sensor data can be parsed.

Campaign management requests, or requests for data fitting a specific profile, are valid for a limited time. Further, campaign management requests are not guaranteed to yield results or to generate complete results as the requestor is not in control of the vehicles that travel within the road network and gather the sensor data. Embodiments described herein provide a system that interfaces with campaign management architecture to determine what data is needed and to automatically request source data to efficiently discover, validate, create, and maintain map content. Because the volume of available data is so voluminous, embodiments described herein only request and receive specific data based on a campaign management request to avoid unnecessary data processing and to avoid costly processing of data that is of relatively lower value than what is needed to create and update map data.

Sensor data from different suppliers (e.g., Original Equipment Manufacturers (OEMs), map data service providers, etc.) received in response to campaign requests may not be in a consistent format. Embodiments provided herein convert data to a standardized format for consistent processing. Event streams to ingestion consumers or campaign requestors contain lightweight metadata referencing standard format storage. The metadata and standardized format storage have similar data retention policies. To improve efficiencies and to improve the overall functioning of the computer itself in processing the incoming data, no OEM sensor data is converted to the standardized format or provided to the map data service provider recipient without a properly sized use case based request (e.g., an associated campaign request that the data satisfies).

FIG. 1 illustrates a communication diagram of an example embodiment of a system for implementing example embodiments described herein. The illustrated embodiment of FIG. 1 includes a map services provider 116, a processing server 102 in data communication with a geographic map database, e.g., map database 108 through a network 112, one or more mobile devices 114, and one or more OEMs 118. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. This data can be gathered by an OEM 118 and provided, via network 112, to the map services provider 116. Also, remote sensing, such as aerial or satellite photography, can be used to generate map objects directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The processing server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as “probe data”, may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map objects based on a detailed analysis of probe data and existing map objects. The apparatus may include or otherwise be in communication with a processor 202, a memory 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory 204, and/or the like).

Embodiments described herein avoid the inefficiencies of processing all data from a particular data source, and instead processes only data that fits or satisfies a particular campaign profile. The campaign profile is established based on data needed by a requestor. The source requesting system creates requests for several use cases including: discovery, verification, and updating. Discovery includes a request for low-volume data where there is no existing content within a mapped area. The purpose of a discovery request is to discover new map elements in an area. Verification is a low volume, low frequency request in the vicinity of prior observations. Verification is used to verify the presence of existing map elements. The low frequency of verification reflects that it is used to confirm that map elements in an area have not changed. Updating includes a request for sufficient volume and coverage persistently until input sufficiently matches stored observations. Updating is used when map elements have changed in an area.

Requestors regularly issue campaign requests for source data in a standardized format needed to fulfill their particular use cases and receive metadata in event streams to maintain internal status required to issue requests. Same detection, where data that matches a data model can be culled to avoid processing known data, and data extraction receives only the metadata and standardized format data needed to validate or update observations used for content derivation.

When creating and maintaining data products such as maps using real world detections, generally in the form of sensor data (e.g., OEM sensor data), a large volume of data is available. Most of the available data does not provide value to the system. The sensor data is useful for validating that the existing model is still accurate when the sensor data is the same as a model, and for collecting observations that disagree with the existing data model. Same data may be used to update metadata, such as observation timestamps which can be used in decay models to estimate attribute quality between observation times. Sensor data that is not the same as the data model can be accumulated and used to build areas of interest for map maintenance and efficiently used to select only the data needed to update the map.

As noted above, copious amounts of sensor data from millions of miles of roads are gathered daily by sensor-equipped devices as they traverse road networks. It is unfeasible to use all of this data to update underlying maps of the road networks. Embodiments of the present disclosure serve to filter the sensor data to identify data that is subject to a specific campaign management request such that only a portion of available data is ingested and processed to reduce processing cost and to improve efficiency of probe sensor data processing.

FIG. 3 illustrates an example embodiment of sensor data collection from a plurality of data sources 302. The data from the data source is sensor data, and may be provided by the device generating the sensor data (e.g., a mobile device, vehicle, etc.), or may be provided by a data aggregator, such as an OEM that collects sensor data from vehicles employing the OEM software and/or hardware. For example, an OEM may be a vehicle manufacturer, a navigation system manufacturer/provider, or sensor suite manufacturer/provider, etc. Regardless of the source, sensor data observations 304 are provided to a service provider such as the illustrated map services provider 310, which may correspond with map service provider 116 of FIG. 1.

FIG. 3 illustrates an example embodiment in which a continuous stream of new observations are received, such as from vehicles traveling within a road network, aerial images, stationary sensors, etc. The observations from the different data sources can be received, for example, by a map services provider 310 or other entity functioning to aggregate and compare the observation data together with prior state model data. These different sources of data provide observations that can include different information with different levels of detail regarding a given geographic area and different temporal significances, such as real-time or periodically (hourly, daily, monthly, quarterly, etc.).

Sensor data observations can include observations of objects within a geographic region. While sensor data can be a continuous stream of data from a trajectory, sensor data typically includes instances of discrete observations, particularly for discrete objects such as signs, poles, or other objects that have discrete locations. Observations that include continuous objects can include periodic observations of the continuation of the same object, such as lane lines, for example.

FIG. 4 illustrates a functional overview of processing sensor data based on campaign management requests. The functional overview is described herein using different requesters for discovery, verification, and updating. These requestors can be the same in some embodiments and the process is similar among the requestors. The discovery requester 402 creates discovery requests in the coverage area where there is no existing map data. This request, as with all requests described with respect to FIG. 4, are campaign management requests. Discovery requests cover a large geographic area, requesting a relatively low volume of standardized data. Discovery requests are generally infrequent and may be designed to sweep through the coverage area over time periodically. Responses to discovery requests are expected to be rare and associated with previously unknown road networks. Discovery requests do not accept data that covers existing map features that are known within the map data. This renders discovery requests highly efficient at detecting new map features within a geographic area. In the illustration of FIG. 4, the discovery requests follow the dotted line.

The verification requester 404 creates verification requests for within a geographic area where there are observations that are aging, and confirmation of the presence of map features is necessary to maintain freshness of the map data. Verification request are limited to areas where there are aging observations, and the volume of requested sensor data is relatively low as confirmation of existence does not require substantial data. In the illustration of FIG. 4, the verification request follows the dash-dot-dash line.

The update requester 406 creates update requests. The update requester accumulates deltas (changes) and other sensor data (e.g. construction indication, observation uncertainty) to determine where additional source data is needed to build or update the map. Update requests target update areas of a geographic area for a target number of drives in each relevant direction of travel. In the illustration of FIG. 4, the update request follows the dash-dot-dot-dash line.

Campaign requests are generated from the requesters, and the campaign management subsystem 410 works with ingestion subsystem 420. The campaign management subsystem 410 has an interface that customers/requesters use to request data in an area, during a duration of time, at a rate or quantity that meets inclusion criteria for a campaign. The ingestion subsystem 420 brings data sources into the map data and converts them to standardized formats, such as converting OEM data into a standardized format. The ingestion subsystem 420 uses the campaign management subsystem 410 to evaluate and select data based on customer criteria specified in the campaign management interface. This is performed in the KeepOrDrop Catalog 430. Selected data is converted to the appropriate format, cached, and metadata is sent to customers the request satisfies via customer event streams.

The campaign management subsystem 410 receives the campaign requests via the interface format, and determines whether ingested data from the ingestion subsystem 420 satisfies the campaign request. The Source Data (SD) is received at ingestion from source reporting data streams (e.g., OEMs, vehicles, map data service providers, etc.) and is aggregated at source usage aggregator 440. That source data is filtered at 442 and provided to the KeepOrDrop Catalog 430 of the campaign management subsystem 410. If the source data does not satisfy the campaign request, it is rejected. If the source data satisfies the campaign request, it is accepted. The source data is provided to a data lake 422 or S3 bucket or platform object store, and the standardized data and metadata are provided from the ingestion subsystem 420 in the discovery and verification event stream to provide standardized data selected by the discovery and verification campaign requests for same detection at 450, described further below.

The source data as standardized data along with metadata from the source data are provided at 426 from the stream layer for drive filtering at 460. At this point a fusion of the heterogeneous or homogeneous drive data (source data and metadata) can be performed. The illustrated embodiment depicts a specific process for this data fusion, though other processes may be used (e.g., Simultaneous Localization and Mapping or SLAM). The update standardized data event stream provides standardized data selected by the update campaign requests. Aggregation of the drives is performed as shown at 462 including aligning drives at 464 and correcting translational error across drives. Conflation occurs at 466 where multiple observations from different sources are collected together and fused into a consensus observation, confabulating continuations and connections of linear features which are conflated with existing data. The conflated data is consumed by observation storage services 470 that integrate the data into a persisted model and output events representing change (e.g., add, modify, delete features). This process can collectively be referred to as a fusion. For the system to robustly handle false positives, the observations are stored in the observation storage services 470 and flagged rather than deleted. For the system to robustly handle out-of-date and out-of-order data (e.g., weeks old OEM sensor data or observations from satellite images taken years ago), some history of observations must also be stored in the observation storage services 470 and flagged rather than deleted.

The observation metadata 472 is a service to store high frequency/low latency feature metadata (e.g., timestamps, quality information, etc.) at a higher cadence than is required by content derivation. Feature observation timestamps will be stored by the observation storage services 470 when features are created or modified, and they may be updated when same detection matches new observations to existing features, described further below with respect to same detection 450. The observation storage services provides the observed map features in the source data to a database of observation features 474, which are in turn used by the discovery requester 402 to identify areas of the mapped geographic region that lack map data. The observation features 474 are used by the verification requester 404 to identify map data that may require verification, such as observations with relatively lower confidence levels, or observations that are not as fresh or recent as they should be. The observation feature 474 are provided to the update requester to identify uncertainties, where there may be low confidence observations or conflicting observations, for example.

The content derivation 480 subsystem maintains the observation storage services 470 and the observation metadata 472. The content admin 476 establishes the inclusion area 478 covered by the map data and metrics associated with the mapped region. For example, campaign requests include source data metrics that define what data is relevant to the request in order to receive only source data that is useful and beneficial to the requester. The inclusion area 478 includes metrics defining the mapped region to ensure metrics of a request are satisfied for the mapped area.

The discovery requester 402 is responsible for creating campaign management requests intended to discover new areas where observations have not yet ben made. Discovery campaign management requests are broad area, low volume requests that cover the entire map coverage area (the intersection of the map area and data sourcing areas) not already covered by known observations. Most discovery campaign management requests are not expected to receive responses, but when they do, the volume requested should be sufficient tot rigger same detection and update requester to request the volume of data needed to create or update the map database content.

Discovery requests may not strictly be necessary for a system to maintain or update a map built from an existing map if there is sufficient information for the verification requester to trigger requests as may be the case with seeded map content. The verification requester, for example, may listen to road topology in addition to observations to trigger collection of sensor data where roads exist.

The verification requester 404 is responsible for creating campaign management requests intended to validate the observations already stored in the map database. Verification campaign management requests are low frequency, low volume requests specifically where observations are already known to exist. The volume requested should be sufficient to trigger same detection and update requester to request the volume of data needed to create or update the map database content. The verification requester may request verification data based on (the falling edge of) the construction flag in an area, or other inputs.

The update requester 406 is responsible for creating campaign management requests intended to deliver the data required to create or update the map database. Update campaign management requests request a volume of data in all relevant driving directions as soon as the data is available, possibly with some content requirement to improve quality (e.g., omit content with headlights on or windshield wipers on, etc.). The trigger for these events is same detection's inability to match sensor data standardized observations to map database observations. The update requester receives deltas or differences discovered by same detection 450 that are either changes in observables or observables in the standardized data that are not represented in the observation storage services 470. The update requester 406 accumulates deltas to build confidence and scope to make update requests and may even create additional verification requests if needed.

Same detection 450 is responsible for updating observation timestamps in observation metadata, and informing the update requester where additional data is needed (e.g., not same locations). Discovery and verification request standardized observation data are compared to the map database observations. Where matches are discovered, events are output to update feature timestamp (e.g., same data). Where standardized sensor data observations cannot be matched to observation storage services observations, including false positives and observations from recent history, the deltas are sent to the update requester 406.

Same detection works with campaign management to reduce processing requirements and improve the efficiency with which sensor data is processed. Same detection compares source data that satisfies the campaign request with a model reflecting the map data in the observation storage services 470. Same detection analyzes source sensor data to determine if the sensor data is consistent with a model or different from the model, and more particularly, to using sensor data that is consistent with the model to verify the model, and using sensor data that is different from the model to identify regions of the model requiring updates. A model, as described herein, includes geographic data associated with an environment including object location and identification. Embodiments process sensor data in an efficient and effective manner to determine if the sensor data is the same as the model, or different from the model, and uses that determination for establishing how the sensor data will be used.

When creating and maintaining data products such as maps using real world detections, generally in the form of sensor data (e.g., OEM sensor data), a large volume of data is available. Most of the available data does not provide value to the system. The sensor data is useful for validating that the existing model is still accurate when the sensor data is the same as a model, and for collecting observations that disagree with the existing data model. Same data may be used to update metadata, such as observation timestamps which can be used in decay models to estimate attribute quality between observation times. Sensor data that is not the same as the data model can be accumulated and used to build areas of interest for map maintenance and efficiently used to select only the data needed to update the map. Further, when false positive observations are included in the data model, same data detection can filter them as naturally and efficiently as true positives, which further improves the efficiency of embodiments described herein.

Embodiments of the present disclosure employ a model of features and objects of an environment as a pre-screening stage in comparing received sensor data to establish if the sensor data is consistent with the model (same data) or distinct from the model (novel data). The model is a high-level representation of the environment and is not the same as the underlying map that is used as the deliverable for use by location-based service providers and clients. The model maintains a representation of the objects identified in the environment through sensor data, even to include falsely-identified objects or false-positives as further detailed below.

Incoming sensor data collected during campaign requests is compared to an existing model using same detection 450. If the incoming sensor data corresponds or matches with the model, the same data may be verified, and the same observation metadata timestamp can be used to update observation metadata 472 to reflect the freshness of the observation. If the observation in the source data is different, the data can be provided to update requester 406 as new map data that requires updating.

Based on reliability measures of features and attributes from various sources, an estimate of novelty of the not-same data may be derived in that can be used to determine areas of interest for map maintenance and updating. The model of observations to which the sensor data is compared includes false positives such that future false positives will naturally be filtered as uninteresting by the same-detection or similar difference-measuring schemes.

Embodiments described herein function to filter sensor data in a manner that reduces processing requirements and improves the efficiency of map generation and healing through limiting the volume of data used to update and generate map data. Embodiments receive data from various sources and establish if the sensor data satisfies a campaign request. Data that satisfies a campaign request is used to generate, update, and heal digital map data. The output is map data with an estimate of the map objects and the true object position within the map geometry that is built and updated in an efficient manner.

FIG. 5 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 5. The illustrated method may be performed, for example, by apparatus 200 using processor 202 with program code instructions stored in memory 204 to cause the apparatus to perform the operations of the method of FIG. 5. As shown at 510, apparatus is caused to receive a campaign management request defining requested data source metrics. This request can be in the form of a discovery request, verification request, or update request, for example. Source data is received at 520 from a plurality of sources within a geographic area. A subset of the source data is determined at 530 satisfying the requested source data metrics. The subset of source data satisfying the requested source data metrics is processed at 540 to obtain observations. Map data of a map database is updated at 550 based on the observations.

In an example embodiment, an apparatus for performing the methods of FIG. 5 above may include a processor (e.g., the processor 202) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising at least one processor and at least one memory including computer program code, the at least one memory and computer program code configured to, with the processor, cause the apparatus to at least:

analyze data for a geographic region to identify a target area, wherein the target area comprises a defined geographic boundary, wherein the target area is determined based on a need to update or build map data within the target area;

receive a campaign management request defining requested source data metrics, wherein the requested source data metrics defines a profile of data that is relevant to the campaign management request and wherein the profile comprises the target area and at least one of a specified data quality or data reliability;

receive source data from a plurality of sources within a geographic area;

determine a subset of the source data that satisfies the requested source data metrics, wherein the subset of the source data is from the target area within the geographic area;

process the subset of the source data satisfying the requested source data metrics to obtain observations;

update map data of a digital map database based on the observations, wherein the observations determined to correspond to existing observations of an existing model are used to update timestamps of the existing observations without updating the existing observations, and wherein the observations determined to not correspond to the existing observations of the existing model are used to update the existing observations; and provide for semi-autonomous vehicle control using the updated map data.

2. The apparatus of claim 1, wherein the apparatus is further caused to convert the subset of the source data that satisfies the requested source data metrics to a standardized format, wherein causing the apparatus to process the subset of the source data satisfying the requested source data metrics to obtain observations comprises causing the apparatus to process the subset of the source data satisfying the requested source data metrics in the standardized format.

3. The apparatus of claim 1, wherein the observations are consensus observations, wherein causing the apparatus to process the subset of the source data satisfying the requested source data metrics to obtain observations comprises causing the apparatus to fuse the subset of the source data satisfying the requested source data metrics to obtain the observations.

4. The apparatus of claim 3, wherein causing the apparatus to fuse the subset of the source data satisfying the requested source data metrics to obtain the observations comprises causing the apparatus to:

aggregate drive instances within the source data along to form aggregated drives;

align the aggregated drives with underlying map data to form aggregated, aligned drives; and conflate the aggregated, aligned drives into the consensus observations.

5. The apparatus of claim 1, wherein causing the apparatus to process the subset of the source data satisfying the requested source data metrics to obtain observations comprises causing the apparatus to:

determine if the subset of the source data satisfying the requested source data metrics is same data relative to the map data of the digital map database; and generate a map data difference in response to the subset of the source data satisfying the requested source data metrics being different relative to the map data of the digital map database.

6. The apparatus of claim 1, wherein the apparatus is further caused to:

provide for navigational guidance using the updated map data.

7. The apparatus of claim 1, wherein the requested source data metrics comprise one or more of: an indication of windshield wipers being off when the source data was collected or an indication of headlights being off when the source data was collected.

8. The apparatus of claim 1, wherein causing the apparatus to process the subset of the source data satisfying the requested source data metrics to obtain observations comprises causing the apparatus to convert the subset of the source data into a standardized format for the observations, wherein the standardized format comprises metadata.

9. The apparatus of claim 1, wherein the source data comprises sensor data received from vehicles traveling within the geographic area.

10. A method comprising:

analyzing data for a geographic region to identify a target area, wherein the target area comprises a defined geographic boundary, wherein the target area is determined based on a need to update or build map data within the target area;

receiving a campaign management request defining requested source data metrics, wherein the requested source data metrics defines a profile of data that is relevant to the campaign management request and wherein the profile comprises the target area and at least one of a specified data quality or data reliability;

receiving source data from a plurality of sources within a geographic area;

determining a subset of the source data that satisfies the requested source data metrics, wherein the subset of the source data is from the target area within the geographic area;

processing the subset of the source data satisfying the requested source data metrics to obtain observations;

updating map data of a digital map database based on the observations, wherein the observations determined to correspond to existing observations of an existing model are used to update timestamps of the existing observations without updating the existing observations, and wherein the observations determined to not correspond to the existing observations of the existing model is used to update the existing observations; and providing for semi-autonomous vehicle control using the updated map data.

11. The method of claim 10, further comprising converting the subset of the source data that satisfies the requested source data metrics to a standardized format, wherein processing the subset of the source data satisfying the requested source data metrics to obtain observations comprises processing the subset of the source data satisfying the requested source data metrics in the standardized format.

12. The method of claim 10, wherein the observations are consensus observations, wherein processing the subset of the source data satisfying the requested source data metrics to obtain observations includes fusing the subset of the source data satisfying the requested source data metrics to obtain the observations.

13. The method of claim 12, wherein fusing the subset of the source data satisfying the requested source data metrics to obtain the observations comprises:

aggregating drive instances within the source data along to form aggregated drives;

aligning the aggregated drives with underlying map data to form aggregated, aligned drives; and conflating the aggregated, aligned drives into the consensus observations.

14. The method of claim 10, wherein processing the subset of the source data satisfying the requested source data metrics to obtain observations comprises:

determining if the subset of the source data satisfying the requested source data metrics is same data relative to the map data of the digital map database; and generating a map data difference in response to the subset of the source data satisfying the requested source data metrics being different relative to the map data of the digital map database.

15. The method of claim 10, further comprising:

providing for navigational guidance using the updated map data.

16. The method of claim 10, wherein the requested source data metrics comprise one or more of: an indication of windshield wipers being off when the source data was collected or an indication of headlights being off when the source data was collected.

17. A computer program product comprising at least one non-transitory computer-readable storage medium having computer-executable program code instructions stored therein, the computer-executable program code instructions comprising program code instructions to:

analyze data for a geographic region to identify a target area, wherein the target area comprises a defined geographic boundary, wherein the target area is determined based on a need to update or build map data within the target area;

receive a campaign management request defining requested source data metrics, wherein the requested source data metrics defines a profile of data that is relevant to the campaign management request and wherein the profile comprises the target area and at least one of a specified data quality or data reliability;

receive source data from a plurality of sources within a geographic area;

determine a subset of the source data that satisfies the requested source data metrics, wherein the subset of the source data is from the target area within the geographic area;

process the subset of the source data satisfying the requested source data metrics to obtain observations;

update map data of a digital map database based on the observations, wherein the observations determined to correspond to existing observations of an existing model are used to update timestamps of the existing observations without updating the existing observations, and wherein the observations determined to not correspond to the existing observations of the existing model is used to update the existing observations; and provide for semi-autonomous vehicle control using the updated map data.

18. The computer program product of claim 17, further comprising program code instructions to convert the subset of the source data that satisfies the requested source data metrics to a standardized format, wherein the program code instructions to process the subset of the source data satisfying the requested source data metrics to obtain observations comprise program code instructions to process the subset of the source data satisfying the requested source data metrics in the standardized format.

19. The computer program product of claim 17, wherein the observations are consensus observations, wherein the program code instructions to process the subset of the source data satisfying the requested source data metrics to obtain observations comprise program code instructions to:

aggregate drive instances within the source data along to form aggregated drives;

align the aggregated drives with underlying map data to form aggregated, aligned drives; and conflate the aggregated, aligned drives into the consensus observations.

20. The computer program product of claim 17, wherein the program code instructions to process the subset of the source data satisfying the requested source data metrics to obtain observations comprise program code instructions to:

determine if the subset of the source data satisfying the requested source data metrics is same data relative to the map data of the digital map database; and generate a map data difference in response to the subset of the source data satisfying the requested source data metrics being different relative to the map data of the digital map database.

* * * * *